3,608,295
HIGHLY ELASTICIZED FIBROUS COMPOSITE AND A METHOD FOR MANUFACTURING THE SAME
Tohru Kitazawa, Osaka-shi, Osaka, Japan, assignor to Kanegafuchi Boseki Kabushiki Kaisha, Tokyo, Japan
Filed Apr. 28, 1969, Ser. No. 819,913
Claims priority, application Japan, May 6, 1968, 43/29,935
Int. Cl. D02g 3/04, 3/32, 3/36
U.S. Cl. 57—140BY                                    30 Claims

ABSTRACT OF THE DISCLOSURE

A method for manufacturing a highly elasticized fibrous composite by uniting polypivalolactone components with other componental fibers and thermally treating thus obtained composite yarn at a temperature high enough to elasticize the polypivalolactone component. The thermal treatment may take place before and after formation of fabrics from the composite yarns. Necessary content ratio of the polypivalolactone component does not exceed 25% by weight.

---

Figure 1:
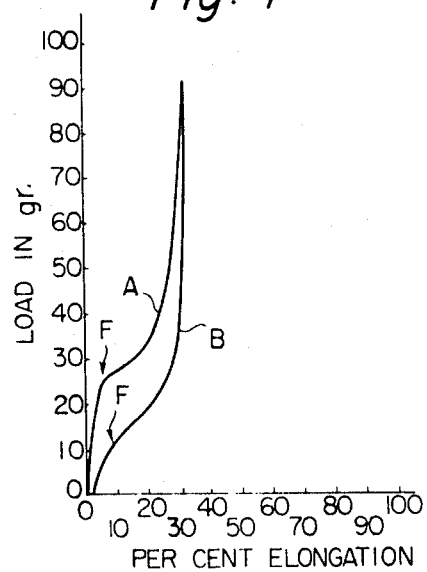

Both loading and unloading cycles of a load-elongation hysteresis curve of the obtained highly elasticized fibrous composite are provided with upwardly concave portions in an elongation area below 20%. Large primary elastic modulus results together with enhanced elongation recoverableness.

The present invention relates to a highly elasticized fibrous composite such as an elastic composite yarn, a net, a knitted fabric, a woven fabric or a felt fabric made up of at least two kinds of component yarns, at least one of which includes elastic fibers, and a method for manufacturing such a highly elasticized fibrous composite.

The term "fibrous composite" as hereinafter used refers to any type of composite made up of fibrous material such as a thread, a yarn, a strand, a rope, a net, a knitted fabric, a woven fabric, a felt fabric and a non-woven fabric.

The term "high elastic fibrous composite" as hereinafter used, refers to the above-defined fibrous composite provided with a moderate resistance against stretching represented by its large initial modulus, a large elongation percentage and a high degree of tensile recovery represented by its particular load-elongation hysteresis curve.

A desirable stretching characteristic can be observed even in the case of a conventionally known crimped textured yarn having three dimensional crimps and manufactured by combined application of suitable dimensional deformations such as twisting or bending with a suitable thermal treatment upon a synthetic or semi-synthetic fiber yarn, or in case of a conventionally known crimped filament yarn manufactured from conjugate filament spun from two component polymers of different properties and developing crimps on the yarn by a suitable subsequent treatment. However, such conventional yarns lack tensile recovery. Therefore, a composite yarn made up of such yarns can hardly maintain its crimped configuration after repeated stretching operations and its tensile recovery becomes poorer after repeated stretching operations.

In spite of its relatively large elongation at its break point and tensile recovery, a rubber yarn and a synthetic segment elastomer yarn composed of polyurethane filament are provided with inferior rigidity and a small tensile recovering force and it is rather difficult to obtain a yarn of finer deniers. So, an elastic yarn composed of such elastomer yarns has an indesirable handling quality and presents large elongation by an application of a relatively small load. Because of such inferior functional characteristics, many processing troubles usually take place in the subsequent knitting or weaving operations of the yarn resulting in difficulty in the manufacture of highly and uniformly qualified textile products. Such drawbacks of the yarn of the above-mentioned type may be mitigated by increasing the content ratio of the elastic component yarn within the composite yarn and the tensile recovery force may be accordingly enlarged. However, this inevitably entails dilution of desirable functional characteristics of other component fibers.

Further, such a conventional elastic composite yarn is manufactured by combining the elastic component yarn maintained in a stretched condition with another component yarn. In this connection, a particular yarn feeding device and drafting device are generally required to be installed so as to control the yarn tension precisely during the stretching.

The inventors of the present invention recognized particular physical properties of polypivalolactone fibers and thought of utilizing the fibers as a component of the elastic composite yarn. After repeated research on this subject, they succeeded in manufacturing, on a commercial scale, a highly elasticized fibrous composite having excellent tensile recovery characteristics eliminating the above-described drawbacks possessed by the conventional elastic composite yarns.

A principal object of the present invention is to provide a highly elasticized yarn having excellent tensile recovery characteristics such as percent tensile recovery and recovery force and elongation at break with a large primary initial modulus.

Another object of the present invention is to provide a highly elasticized fibrous composite, such as a rope, a net, a knitted fabric, a woven fabric and a felt fabric made up of highly elasticized composite yarn, which is provided with large percent elongation at break and percent recovery, a desirable dimensional stability against repeated stretching, maintenance of elastic properties and stability against severe thermal attacks.

Another object of the present invention is to provide a high elastic fibrous composite substantially having, in spite of relatively large content ratio of non-elastic component fibers, excellent tensile recovery characteristics together with desirable functional features of the non-elastic component fibers.

Still another object, which is the most important, of the present invention is to provide an industrial method for manufacturing the above-described high elastic fibrous composite in an outstandingly simple manner.

In order to attain the above-described objects of the invention, the method of the present invention comprises forming a single composite yarn by a combination of, at most, 25% by weight of yarns substantially composed of polypivalolactone and whose elongation recovery characteristics can be remarkably enhanced by an application of thermal treatment together with at least 75% by weight of yarns composed of non-elastic fibers and whose elongation recovery characteristics are substantially not affected by the above-described thermal treatment. The combination is performed substantially without stretching the former. Subsequently after this combination, the combined composite yarn is subjected to a thermal treatment for the development of the elastic properties of the component polypivalolactone fibers. This thermal elasticization is carried out at a temperature of at least 100° C. but not exceeding a temperature 20° C. below the lowest temperature of the melting points and the decomposition points of the component fibers.

The term "polypivalolactone" as used herein refers to a linear ester polymer having a chemical structure generally given by a structural formula

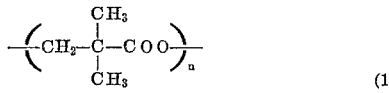 (1)

and are easily manufactured by the polymerization of hydroxypivalic acid or its esters as disclosed in the United States Patent No. 2,658,055 or by the polymerization of pivalolactones as disclosed in the British Patent No. 766,347.

The yarn substantially composed of polypivalolactones, as named herein, includes not only fibers whose fiber-forming component polymer is composed of only polypivalolactone, but also fibers composed of such copolymers as is below described. The copolymer can be contained in the fiber at a content ratio of up to 30 mol percent as far as it does not disturb the highly oriented crystal configuration of the fiber. The fiber can also be made up from a blend of the above-described polypivalolactones or copolymerized polypivalolactone with a relatively small quantity of other polymers. These fibers build up a yarn in the form of a monofilament, multifilaments or staple fibers.

Polypivalolactone is provided with an outstandingly particular chemical characteristic quite different from those of the conventionally utilized polyamides and polyesters such as polyethylene terephthalate. Due to its tendency of rapid crystallization, a particular caution is required in the selection of the processing conditions in the fiber-forming process by melt-spinning of polypivalolactone.

One example of the above-described fiber-forming process was disclosed already in U.S. patent application Ser. No. 634,224, filed Apr. 27, 1967, of which applicant is a co-inventor.

According to the above-described disclosure, polypivalolactone polymers having an intrinsic viscosity ($\tau$) of at least 0.7 are firstly melt-spun through spinning nozzles of larger than 0.5 mm. hole diameter at a temperature in a range from 240 to 280° C. The extruded polymers are secondly subjected to a high draw dawn operation while they are still in a molten or plastic state. This draw dawn operation is performed at a deformation ratio A defined by:

$$A \geq 1367(\tau)^{-5.612} \quad (2)$$

Thus obtained undrawn filaments are thirdly advanced to a drawing process carried out at a drawing temperature T defined by;

$$T \geq -282 + 1744R - 1605R^2 \quad (3)$$

and $$10 \leq T \leq 220 \quad (4)$$

where $R$=Degree of orientation of the undrawn filament
$T$=Drawing temperature in ° C.

Another example of the above-described fiber-forming was also disclosed already by the inventors of the present invention in their United States patent application Ser. No. 745,168. According to the disclosure of the above-mentioned patent, polypivalolactone polymer having an intrinsic viscosity ($\tau$) of at least 1.1 is firstly melt-spun through spinning nozzles of relatively large hole diameter at a temperature ranging from 240 to 310° C. The extruded polymers are secondly subjected to a high draw dawn while they are still in a molten or plastic state. This draw dawn operation is carried out at a draft ratio A defined by $$A \geq 2460[\tau]^{-5.970} \quad (5)$$

and $$A \geq 76[\tau]^{-1.599} \quad (6)$$

By processing the material polymers under the above-defined processing conditions, filaments suitably usable for the purpose of the present invention can be acquired without adopting the so-called drawng operation, also.

Thus obtained polypivalolactone filament, even after the application of only the drawing operation, can present remarkably desirable tensile recovery characteristics when it is subjected to an elongation of limited percent elongation. For example, its tensile recovery is about 90% against 5% elongation, however, it retains only several tens percentage points of residual elongation. In case the extruded filament is not subjected to a drawing operation, it creates a plastic deformation even against a small extent of elongation and tends to lose its tensile recoverableness under a highly elongated condition.

Enhancement of such poor tensile recovery characteristics can be attained by subjecting the obtained filaments to a thermal treatment at a processing temperature at least 100° C., more preferably at least 120° C., in combination with other suitably selected processing conditions. Thus thermally treated polypivalolactone yarn is provided with at least 95% tensile recovery from 5% elongation, at least 92% tensile recovery from 10% elongation, at least 85% tensile recovery from 20% elongation, an initial modulus in a range from 15 to 80 g./denier and an extremely enhanced tensile recoverableness. That is, the filament is converted into a highly elasticized filament by the above-described thermal treatment.

Although the resulting functional properties of the thus obtained highly elasticized polypivalolactone fibers are, to some extent dependent upon the manufacturing conditions, they are generally provided with a remarkably enhanced rigidity in comparison with the conventional elastic fibers such as a rubber yarn or a synthetic segment polyurethane yarn. For example, after the thermal elasticization, the polypivalolactone fiber is provided with an elastic modulus of at least ten times that of the polyurethane elastomer fiber and at least twenty times that of the rubber yarn. From this fact it can be concluded, that in order to provide a polypivalolactone containing elastic composite yarn with a tensile recoverableness approximately the same with that of a polyurethane elastomer containing elastic composite yarn, the necessary but sufficient content ratio of the polypivalolactone fibers within the composite yarn is one-tenth or below that of the polyurethane elastomer yarns within the composite yarn.

The smallest fineness of the polyurethane elastomer yarn today available on the market is about 40 deniers and the polyurethane elastomer yarn of 70 denier or finer is often accompanied with variation in tension or with yarn breakage during the manufacture of the composite yarn due to its inferior handling quality or poor tensile recovery force. For this reason, polyurethane elastomer yarn of 70 denier or larger is generally utilized in the actual production of the elastic composite yarns. Consequently, the content ratio of the polyurethane components within the resultant composite yarn inevitably becomes so large as from 10 to 40% by weight. This is also a greater drawback with respect to rubber yarns and the available minimum fineness is about 300 denier in the case of rubber yarn.

In contrast with this, the available minimum fineness is about 1.5 denier in the case of the polypivalolactone yarns. Because of their remarkably large initial modulus and excellent tensile recovery force, the content ratio of the polypivalolactone component within the resulted composite yarn can be considerably small. A content ratio of at most 25% by weight, more preferably smaller than 10% by weight, is large enough to fulfill the objects of the present invention. However, depending upon the requirement on the final product made up of the elastic composite yarns, the content ratio can be 5% or smaller by weight, or more preferably 1% or smaller by weight. The most important thing to bear in mind is not to dilute the desirable functional properties of the non-elastic fibers to be combined with the elastic polypivalolactone component while providing the resultant composite yarn with sufficient tensile recoverableness. In this connection, caution should be placed upon the selection of polypivalolactone components having as large an initial elastic modulus as possible and a minimum but sufficient content ratio of the elastic component should be selected for providing the resulting elastic composite yarn with desired elastic properties.

As is well-known, some extent of tensions are usually loaded on the yarns in the processes following the yarn formation. The tension amount is from 5 to 20 gr. in the case of warping or slacking, from 20 to 30 gr. in the case of a picking motion on weaving looms and from 5 to 10 gr. in case of knitting. When such a polypivalolactone yarn of remarkably high modulus as giving a percent elongation not exceeding 20% is duly selected, the required content ratio of the yarn will not usually exceed 10%. On the contrary, when a polypivalolactone yarn of small initial modulus is unduly selected, a larger content ratio of the yarn will be requested. In any case, it is desirable that the content ratio of the elastic polypivalolactone yarn is smaller than 25% in order to sufficiently utilize the desirable functional properties of other component fiber and to obtain a relatively easily extensible composite yarn.

In case the polypivalolactone component is given in the form of filaments, the fineness of the yarn may be 70 denier or smaller, or more favorably 30 denier or smaller. In a particular case, it may be even 20 denier or smaller. Only by the employment of the art of the present invention, a high elastic composite yarn of desirable elastic properties can be obtained with the above-described relatively small content ratio of the above-described extremely finer denier yarn. In case the fineness of the yarn exceeds 70 denier, the resulting content ratio of the elastic component inevitably becomes larger and the thickness of the resulting elastic composite yarn becomes larger also. Except in the case of industrial uses such as ropes and cords, such a yarn of large thickness is generally not profitable for clothing use.

The polypivalolactone component of the present invention can also be given in the form of spun fibers which is easily manufactured by any of the conventional spinning methods. It can be used in the form of blended fibers with other suitable fibers according to the requirement in the end use of the resulting composite yarn.

The above-described other component fibers can be chosen from a group composed of such natural fibers as silk, cotton, linen, or wool, such regenerated fibers as viscose rayon or cupraammonium rayon; such semi-synthetic fibers as acetate; or such synthetic fibers as polyamides, polyesters, poly-α-olefines, polyesterethers, polyamino acids, polyvinyl alcohols, polyacrylonitriles or polyethers. They can be used in the form of monofilaments, multifilaments, spun yarns, crimped textured yarns, composite filament yarns or mixed twisted yarns.

The tensile recoverableness of other component fibers to be combined with the polypivalolactone fiber are not varied to a large extent similarly, as the polypivalolactone fiber under the thermal treatment conditions such as treating temperature, treating time and kind of treating medium, applied on the composite yarn for purpose of the elasticization of the polypivalolactone component, though the other properties of the other component fibers are slightly affected. For example, even the polypivalolactone fiber is elasticized so that the polypivalolactone fiber has an elastic recovery of at least 85% when such elongation exceeds 20%, the other component fiber can not be converted to such high elastic fiber. That is to say, no appreciable elasticizing effect will take place on the above-mentioned other component fibers. Thus the above-mentioned other component fibers do not substantially increase their tensile recoverablenesses under the thermal elasticizing condition of the polypivalolactone component.

Because of the presence of such other component fibers, the resulting composite yarn can be provided with characteristic features additional to those given only by the polypivalolactone component. So, it is desirable that the total content ratio of such other component fibers (hereinafter called as additional component fibers) should exceed at least 75% by weight, more preferably 90% by weight, based on the weight of the resulting elastic composite yarn. In some cases, depending upon the requirement in the end use, it may be up to at least 95%, or more preferably at least 99%.

The method for manufacturing the high elastic fibrous composite comprises a first step in which the above-described polypivalolactone component yarn is united with the additional component yarn or yarns in a substantially non-stretched state, and a second step in which the composite yarn thus united is subjected to a thermal elasticizing treatment to be carried out at a temperature of 100° C. or higher but the lowest temperature of the melting points and the decomposition points of the component fibers or not exceeding 20° C. thereunder. This thermal elasticizing operation can be performed both prior to and after forming the fibrous composite such as a fabric from the elastic composite yarns.

The above-described first step means forming a single yarn by combining two or more component yarns together and include the following methods.

(1) A method for forming a covered yarn by winding at least one of the component yarn or yarns like coils around another of the component yarn of yarns.

(2) A method for forming a core spun yarn by placing at least one of the component yarn or yarns as a core of another component yarn in the spinning process of the latter.

(3) A method for doubling at least one component yarn or yarns together with another component yarn or yarns.

(4) A method for doubling and twisting at least one component yarn or yarns together with another component yarn or yarns.

In the configuration of the resulting elastic composite yarn, the polypivalolactone yarn can be contained as either a core-forming component or a sheath-forming component. However, considering the fact that the polypivalolactone yarn contributes to the elastic behavior of the elastic composite yarn and the additional component yarn of non-elastic property takes part in the provision of the fibrous properties of the resulting elastic composite yarn, it is rather preferable to make the polypivalolactone yarn as the core-forming component.

In the manufacturing of the conventional elastic composite yarn, such elastic components as a rubber yarn or a synthetic segment polyurethane yarn is united in a stretched state with other component yarn or yarns.

On the contrary, the polypivalolactone yarn of the present invention is not yet provided with a stretchability in the first step of the uniting operation and the yarn can be processed through the uniting stage without the occurrence of variation in tension or frequent yarn breakages due to considerable deformation. In other words, the elastic component of the present invention can be united with the additional component without substantially placing the latter in a stretched condition. One of the most important advantage of the art of the present invention is the elimination of particular tension control even in case polypivalolactone yarns of remarkably finer denier are used. This further accompanies desirable elimination of particular yarn feeding or draft control devices which are indispensably needed in the case of the conventional elastomer yarns. However, thus united composite yarn is not yet provided with any high degreed elongation recoverableness due to the presence of the polypivalolactone yarn and its appearance and functional features are quite the same with those of the conventional elastic composite yarns.

The subsequent thermal elasticizing operation, the second step will now be explained in more detail.

By an application of a thermal treatment upon the polypivalolactone fibers at a fiber temperature of at least 100° C., an excellent tensile recoverableness, in other words, highly enhanced elastic properties are developed on the fibers together with a moderate contraction depending upon the degree of the processing temperature, length of the processing time and type of heating medium.

The degree of the thermal contraction of the polypivalolactone fiber varies depending upon the processing conditions of the manufacture thereof. For instance, the larger the draft ratio in the spinning or the larger the drawing ratio in the drawing or the higher the processing temperature in the drawing, the larger the percent thermal contraction of the polypivalolactone fiber obtained. In case an identical heating medium is used, the higher the heating temperature, the larger the percent thermal contraction of the fibers. Generally, the percent contraction is in a range from several percentage points to the higher teen percentage points for undrawn polypivalolactone fibers and in a range from several percentage points to several tens percentage points for drawn polypivalolactone fibers. The thermal effect varies also depending upon the type of heating medium used even when the heating temperature is identical. The thermal effect is smallest in the case of a dry heating medium, moderate in the case of steam and largest in the cast of hot water. Provision of an end product of desired properties is assured by a combintiaon of the optimum selection of the material polypivalolactone fibers with corresponding suitable selection of the processing conditions in the thermal elasticization treatment to be applied to the selected material polypivalolactone fibers. In case the polypivalolactone fiber of larger thermal contraction is selected as the core forming component and other yarn of small thermal contraction is used as the sheath-forming component; the thermal contraction of the core component induces expansion of the sheath component by the application of a suitable thermal treatment and the resulting highly elasticized yarn is peripherally and densely covered with numerous crimps and loops of the sheath component yarns.

The composite yarn may be subjected to the above-described thermal elasticization treatment in the form of skeins in a freely contractable state, in a dimensionally defined state, in a controlledly contractable state, in the form of a package, or in the form of a successively advanced yarn strand. This thermal treatment can be applied to the composite yarns after they are constructed into fibrous composites such as woven fabrics, knitted fabrics or felt fabrics.

The application of the thermal treatment can be carried out by placing the fibrous composites for a definite length of time within a hot air chamber, a steam chamber or a hot water bath. It can be also performed by successively advancing the fibrous composites through the above-described chambers or bath. Further, both of the above-described techniques can be employed in a suitable combination. For the purpose of simplification of the manufacturing process, the thermal elasticization can also be carried out by utilizing the thermal treatments employed in the scouring or dyeing in finishing process for the resulting fibrous composites.

The heating temperature adopted in the thermal elasticization should be optimumly selected depending upon the type of heating medium, condition of the composite yarn to be processed, heating system and kinds of additional non-elastic component fibers united with the polypivalolactone fibers.

The general lower limit of the composite yarn temperature under heating should be 100° C., more preferably 120° C., or more preferably 150° C. The upper limit temperature in this sense is mainly dependent upon the types of the fibers composing the composite yarn. It should be a temperature of 20° C. below the lowest temperature of the melting points and the decomposition points of the component fibers. In case the composite yarn is made up of, for example, polycapramide fibers of a 215° C. melting point and polypivalolactone fibers of a 240° C. melting point, the selected upper limit temperature should be of 195° C., which is 20° C. below the melting point of the former. When the composite yarn is made up of the above-described polypivalolactone fibers and polyethylene-terephthalate fibers of a 265° C. melting point, the selected upper limit temperature should be of 220° C., which is 20° C. below the melting point of the former. In case the non-elastic component fibers are natural fibers such as cotton, jute, wool or silk or regenerated fibers, their decomposition points are very high and, consequently, the selected upper limit temperature should be 20° C. below the melting point of the polypivalolactone component fibers.

In case the composite yarn temperature is lower than 100° C., a relatively long heating time is necessary for sufficient elasticization forming a disadvantage in the economical utilization of the method of the present invention in the practical production system. On the contrary, in case the composite yarn temperature exceeds the above-defined upper limit temperature, it approaches the melting point or decomposition point of the component fibers making up the composite yarn and results in the inter-fiber thermal adherence and lowering of the functional properties of the component fibers.

Measurement of the composite yarn temperature can easily be done by using a contact type, radiant heat type or differential type thermometer. The temperature of the heating medium, especially in the case of a gaseous medium, has to be maintained high enough to bring about the above-described composite yarn temperature. The length of the heating time ranges from the second order to a several tens of hours order depending upon the degree of the heating temperature, type of heating medium and the degree of elasticization required.

Generally, the same degree of thermal treatment effect can be expected with a shorter heating time if the heating temperature is higher. While the elongation recoverableness and elasticity of the polypivalolactone fibers are enhanced by thermally treating the fibers for a long time, its load-elongation properties tend to be degraded by such a long thermal treatment. So, an optimum length of heating time must be selected in conformity to the mode of end use.

By the application of the above-described thermal treatment at high temperature, not only the elasticization of polypivalolactone component fiber but also heat setting of the additional component fibers such as polyesters or polyamides, whose heat setting usually requires a high heating temperature from 150 to 200° C., can be attained concurrently. This is one of the greatest advantages of the art of the present invention. Such a combined effect could hardly be expected in the case of the conventional rubber yarns or synthetic segment polyurethane yarns due to the danger of discolouring or thermally damaging those material yarns.

The above-described thermal elasticization of the polypivalolactone fibers, the second step, can be carried out both in the form of a composite yarn in succession with the first step and after constructing the composite yarns into fibrous composites such as woven-fabrics, knitted fabrics, and felt fabrics. In the latter case, forming operation of the fibrous composites from the composite yarns can be performed in a smooth condition because of relatively large resistance of the pre-elasticized composite yarns against stretching. This smooth processing condition assures configurational uniformity of the resulting fibrous composites. Further, it is another of the great advantages of the art of the present invention that a thusly formed non-elastic fibrous composite can easily be converted into elastic fibrous composite of desirable functional properties only by an optimum application of the thermal treatment. Such an advantage can hardly be found in any of the conventional arts of elastic composite yarn manufacturing.

The polypivalolactone fibers elasticized by the application of the above-described thermal treatment can be provided with extremely enhanced tensile recovery, for example, the sufficiently heat treated polypivalolactone fiber can be provided with at least 15 g./denier, or sometimes up to 80 g./denier, initial modulus, a tensile recovery of at least 95% for 5% elongation, at least 92% for 10% elongation, at least 88% for 15% elongation and at least 85% for 20% elongation. Further, the fibers are provided with a large tensile recovery force. This is obviously understood by the observation of the load-elongation behavior of the fibers. On the unloading curve of the load-elongation hysteresis curve of the fibers, the differential coefficient of the curve in the elongation area below 20% increases as it approaches the nil loading point, and this proves that the fiber is provided with extremely large tensile recovery force. The fibers are still accompanied by prominent work recovery and less lowering of its recoverableness even after repeated elongation applications.

The greatest advantage of the polypivalolactone fibers is its excellent stability against thermal attack. It can withstand dry heating at a temperature up to 210° C. and agains wet heating at a temperature up to 180° C. under a stretched condition. Such a high degree of thermal stability can hardly be expected from any of the conventional elastomer fibers.

The highly elasticized composite yarn of the present invention containing the polypivalolactone fibers of the above-described characteristic features possessed moderate elasticity, excellent elongation recovery characteristics, configurational stability against repeated loading application, and prominent thermal stability. Further, because of the excellent rigidity of the polypivalolactone fibers and possibility of the fibers of finer denier, the content ratio of the elastic component and the non-elastic components within the composite yarn can be adjusted, as desired, in accordance with the requirements and objects of the utilization of the resulting composite yarn. Thus, by employing the art of the present invention, it has become possible to lower the content ratio of the elastic component in the composite yarn to below 10% by weight, or in some cases 1% or below by weight, without degrading the elastic characteristics of the resulting composite yarn. Such a lowered content ratio could hardly be obtained in the case of the conventional elastomer containing composite yarn. Thus a completely novel highly elasticized fibrous composite can be obtained with fully improved characteristic features from those of the conventional elastic composite yarn.

Figure 4:
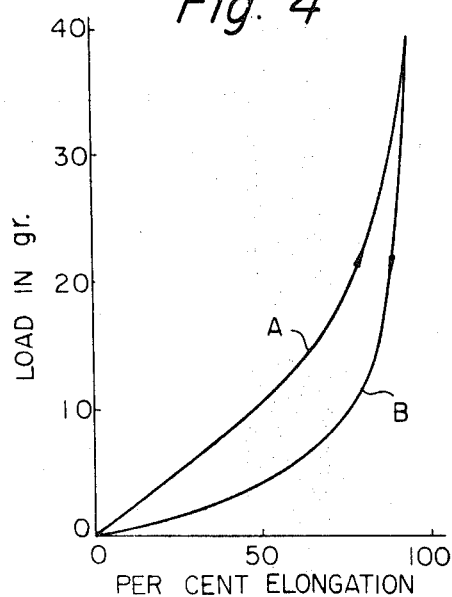
Figure 5:
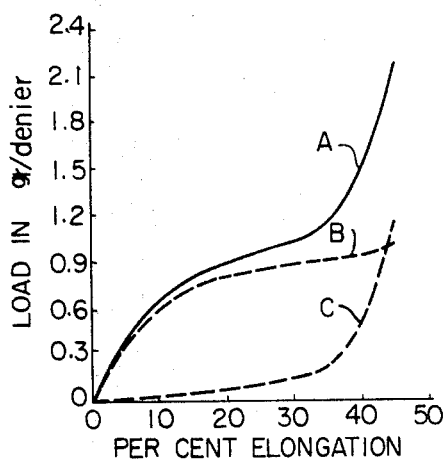
Figure 6:
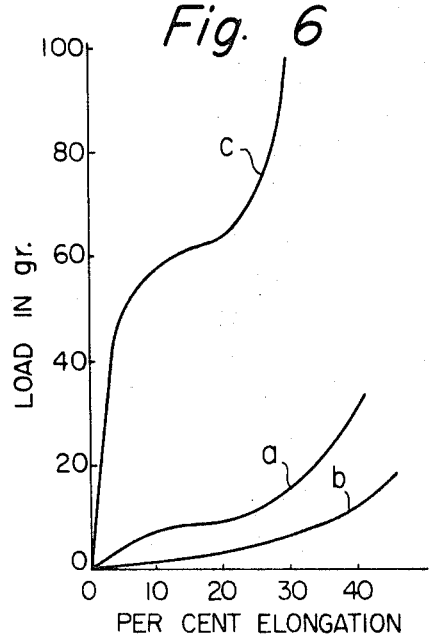
Figure 7:
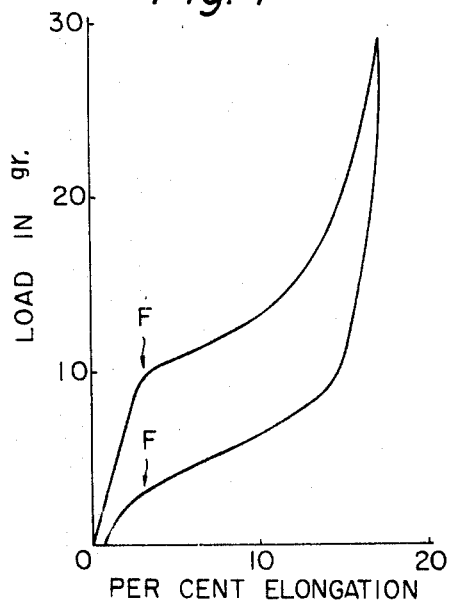
Figure 14:
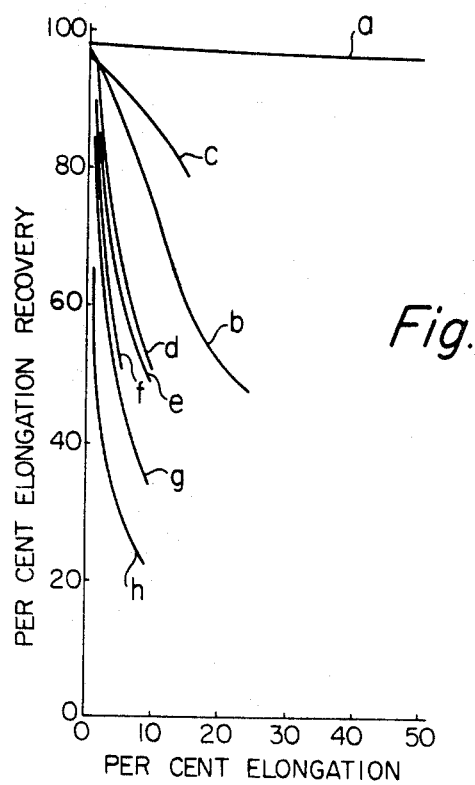

Although the highly elasticized composite yarn of the present invention is provided; with a large resistance against elongation, that is, the composite yarn of the present invention is difficult to elongate to an appreciable extent by a small loading application, the composite yarn of the present invention is provided with extremely prominent elongation recovery characteristics such as a large percent elastic elongation, an extremely large tensile recoverableness, a large recovery force, and a remarkably quick recovery from given elongations. The above-described advantages and characteristic features of the elastic component yarn of the present invention will be made more apparent from the ensuing descriptions with reference to the load-elongation hysteresis behavior shown in the accompanying drawings, wherein FIGS. 1 to 3 are graphs illustrating load-elongation hysteresis behavior of some embodiments of the high elastic composite yarn of the present invention, FIG. 4 is a graphical representation of the load-elongation hysteresis behavior of the conventional synthetic segment polyurethane elastomer composite yarn, FIG. 5 is a graph illustrating the load-elongation characteristics of the high elastic composite yarn of the present invention and a polypivalolactone monofilament composing the composite yarn, FIG. 6 is a graph illustrating the load-elongation characteristics of the high elastic composite yarn of the present invention and two types of the conventional manufactured elastic composite yarns, FIGS. 7 to 13 are graph illustrating characteristics of the high elastic composite yarns obtained in some of the following described examples, FIG. 14 is a graph for showing the dependency of the tensile recoverableness upon the thermal treatment of the polypivalolactone fibers contained in the high elastic fibrous composite of the present invention and of the various kinds of fibers available on the market.

Referring to FIG. 1, a load-elongation hysteresis curve is shown concerning a core-spun yarn of 36% breaking elongation and made up of polypivalolactone multifilament core-component of 15 deniers/6 filaments and cotton spun yarn sheath-component of 60ˢ.

Figure 2:
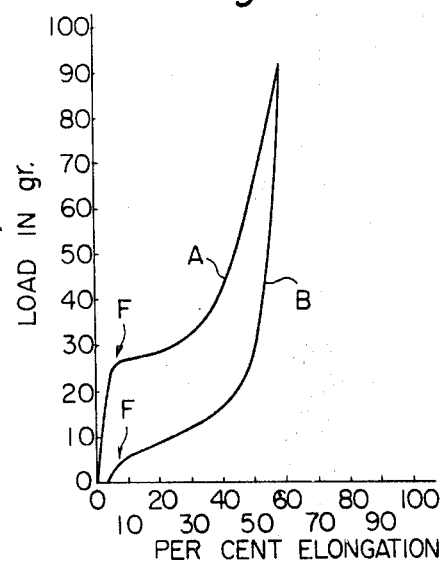

Referring to FIG. 2, a load-elongation hysteresis curve is shown concerning a double-covered yarn of 65% breaking elongation obtained by covering a nylon 6 multifilament yarn of 50 denier/16 filaments around a polypivalolactone core-component of 30 denier/12 filaments and further covering this firstly covered yarn with a cotton spun yarn of 60ˢ.

Figure 3:
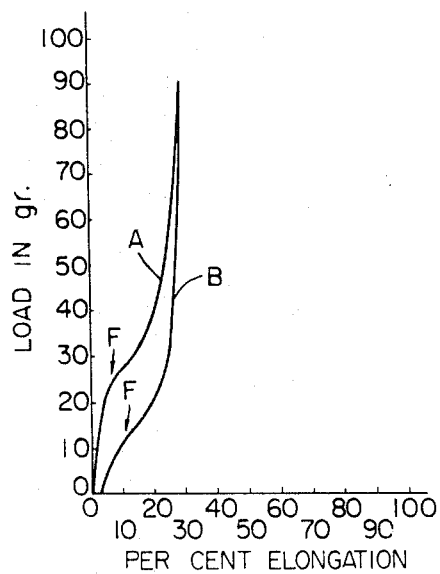

The load-elongation hysteresis curve shown in FIG. 3 relates to a highly elasticized composite yarn of 42% breaking elongation obtained by doubling and twisting together the polypivalolactone multifilament yarn of 30 denier/12 filaments with two cotton spun yarns of 40ˢ/1. The above-described load-elongation hysteresis curves are obtained at a percent elongation as large as 90% and the measuring conditions of the curves are as follows.

Length of the specimen—60 mm.
Elongation and Recovery rate—20 mm./min.
Measuring instrument—Tensiron (Brand of a tension meter produced by Toyosokki Co., Ltd.)
Running speed of the recording paper—60 mm./min.
Full scale load of the recorder—100 g.

Both of the loading curve A and unload recovery curve B shown in FIGS. 1 to 3 are provided with, in a low elongation region below 20%, upwardly convex portions F, wherein the value of differential coefficient decreases with increase in the value of load. The presence of such upwardly convex portions F is the most important characteristic feature of the high elastic polypivalolactone composite yarn of the present invention having an initial modulus, tensile and tensile recovery force despite its large percent breaking elongation. Such a characteristic feature can never be found in any of the conventional elastic composite yarns.

In FIG. 4, a load-elongation hysteresis curve is shown for an elastic composite yarn of 163% breaking elongation and made by double covering a polyurethane elastomer core-component yarn of 210 deniers with nylon 6 sheath-component filament yarn of 50 deniers. As is apparent from the drawing, both of the loading curve A and unloading curve B are provided with upwardly concave portions and not with upwardly convex portions possessed by the curves shown in FIGS. 1 to 3. Such figurational characteristics of the curve suggests the fact that the specimen composite yarn has a small initial modulus despite its large percent breaking elongation, that the composite yarn presents a large extent of elongational deformation by an application of a small load, that the composite yarn has a small recovery force despite its large recoverableness, and that the composite yarn hardly recovers from its elongated state to its original dimensions overcoming the contraction resistance of the non-elastic component fibers or other externally applied forces.

From the foregoing comparison of the load-elongation hysteresis curves, the following characteristic features of the high elastic composite yarn of the present invention has been made apparent.

(1) In the region of relatively small elongation of about 20%, or below, the load-elongation hysteresis curve of the high elastic composite yarn of the present invention is provided with a large initial modulus together with portions whereon the value of differential coefficient decreases with increase in the value of elongation. In other words, the curve is provided with upwardly convex portions in its relatively small elongation area. Because of the presence of such upwardly convex portions in the relatively small elongation area, the highly elasticized composite yarn of the present invention has a large resistance against elongation and can hardly be elongated by the application of such a load as is usually applied on the processing yarn during ordinary weaving or knitting operations while it presents a large elongation by an application of larger loads. For example, if the highly elasticized composite yarn of the present invention is used as warps in the weaving of a warp-stretch fabric, it is very easy to control the yarn tension during the warping operation and the subsequent operations. This results in the provision of the final product having uniform stretch power.

(2) The unloading curve is also provided, in its region of relatively small elongation below 20%, with a portion wherein the value of differential coefficient increases with decrease in the value of load. The presence of such an upwardly convex portion suggests the fact that the work recovery is very large, that a large recovery force and recovery rate can be expected even when a large deformation of the yarn takes place, that the fatigue of the yarn is very small against repeated application of elongation, and that the yarn is provided with an excellent configurational stability and good maintenance of its elastic properties.

Basing upon the analysis of a great number of load-elongation hysteresis curves of the high elastic composite yarn of the present invention, the inventors of the present invention have succeeded in specifying the parameters relating to the above-described characteristic features.

In FIG. 5, load-elongation curves A and B are shown for a composite polypivalolactone yarn containing polypivalolactone monofilamentary core-component yarn of 20 denier and cotton sheath-component yarn of 40$^s$ and for the polypivalolactone monofilamentary yarn respectively, and the curve C corresponds to a difference in load between the curve A and the curve B for respective elongations. That is, the curve C concerns the contribution of the sheath-componental yarn for the load-elongation behavior of the high elastic composite yarn.

It is disclosed in a technical report by Dr. Kiyohisa Fujino, a Japanese researcher in the field of textile engineerings, that the following relationship is experiencedly recognized between the load P and the percent elongation ε in the elongation area of 30% or below, or more generally about 10% or below $$P = X \cdot \epsilon + Y\, 1 - \exp(-Z\epsilon) \quad (9)$$

As is apparent from the drawing, the contribution of the sheath-componental yarn is not appreciable in the above-mentioned elongation area. In the above equation, X is a parameter character of the material relating to the elasticity thereof and is generally proportional to the value of the modulus of direct elasticity in the vicinity of the rapture point. Y is a parameter dependent upon the measuring condition. Generally, the larger the value of Y, the larger the non-elastic resistance of the material against loading. Z is also a parameter dependent upon the measuring condition of the load-elongation curve. Generally, the larger the value of Z, the larger the increase in percent elongation by increase in load.

It was confirmed by the inventors of the present invention that the highly elasticized composite yarn of the present invention can be provided with an excellent utilizability only when the values of parameters X, Y and Z are so selected as shown in Table 1 in the elongation area below the upwardly convex portions in the load-elongation curve, that is, generally in the elongation area of 10% or below.

In case the values of the parameters fall outside the below-defined areas, a poor configurational stability will result and the resulting polypivalolactone composite yarn is less worthy of practical utilization.

TABLE 1

| Parameters | Loading cycle | Unloading cycle |
|---|---|---|
| X | Larger than 2.5 gr. | Larger than 5.0 gr. |
| Y | Larger than 0.20 gr. | Larger than 0.15 gr. |
| Z | Smaller than 120. | Smaller than 150. |

When the fineness of the polypivalolactone core-component yarn is extremely small, or when the content ratio of the polypivalolactone component is excessively small, or when the processing conditions in the uniting operation or in the thermal elasticization are unduly selected, a load-elongation hysteresis curve having figurational characteristics, as shown in FIG. 4, will result and the acquired polypivalolactone composite yarn does not conform to the object of the present invention. Summing up the above-discussion, the interaction between the elongation resistance or elongation recoverableness possessed by the polypivalolactone component and the yarn composing or interfibers entangling tendency of the additional components play an important role in the determination of the functional features of the resulting composite yarn. In the case where the former is overcome by the latter, the resulting composite yarn can not be the high elastic fibrous composite of the present invention and lacks in good appearance, preferable evenness and excellent functional features. The above-described yarn composing tendency is dependent upon the physical properties of the material fibers, composition of the resulting composite yarn and the processing conditions in the composite yarn manufacturing.

By employing the method of the present invention, it has become possible to omit the installation of particular tension controlling devices or introduction of particular tension control which were both indispensably needed in the conventional method of elastic composite yarn manufacture, and to manufacture high elastic fibrous composites having considerably excellent functional features only by utilizing manufacturing equipment of popular types.

The fibrous composites of the present invention such as high elastic composite yarns, ropes, bands, strips, nets, woven-fabrics, knitted fabrics, felt fabrics, and non-woven fabrics have a variety of end uses. They are profitably used, for example, for such body-fit clothings as outerwear, underwear, sportswear, socks and swimming wear; such household articles as carpets, coverings, beddings, room accessories and interior furniture; such industrial materials as tirecords, safety belts, parachutes, moorings and transportings; and such medical uses as bandages, elastic dressing and skid tapes.

Further characteristic features of the art of the present invention will now be made more apparent by illustrating some examples as follows.

In the following Table 2, the manufacturing conditions and characteristic features of the polypivalolactone fibers used in the following examples are shown, and the manufacturing conditions and composition of the composite yarns referred to in the following Examples 1 to 15 are shown together in the following Table 3.

both of the loading and unloading cycles in the elongation area below 20%.

Initial moduli and percent elongation recoveries are measured with respect to polypivalolactone fibers taken out from high elastic composite yarns obtained in respective examples, and the resluts are shown in Table 5.

TABLE 2.—MANUFACTURING CONDITIONS AND CHARACTERISTIC FEATURES OF THE POLYPIVALOLACTONE FIBERS USED IN EXAMPLES 1 TO 15

| Yarn symbol | Drawing condition, temp./ratio | Percent thermal contraction by 180° C. dry heating | Total denier filament | Strength in g./denier | Percent elongation | Initial modulus in g./denier | Percent tensile recovery from— | | | |
|---|---|---|---|---|---|---|---|---|---|---|
| | | | | | | | 5% elongation | 10% elongation | 15% elongation | 20% elongation |
| A | No drawing | 3.1 | 32/6 | 1.8 | 253 | 27 | 89 | | | |
| B | do | 4.8 | 10/1 | 2.0 | 230 | 33 | 91 | | | |
| C | Room/2.3 | 11.9 | 15/6 | 3.3 | 196 | 35 | 90 | 77 | 62 | 53 |
| D | 190° C./1.8 | 20.4 | 7/1 | 4.4 | 104 | 41 | 94 | 92 | 85 | 80 |
| E | 200° C./2.6 | 13.7 | 3/2 | 4.7 | 97 | 48 | 98 | 90 | 85 | 79 |

TABLE 3.—MANUFACTURING CONDITIONS AND COMPOSITION OF THE COMPOSITE YARNS IN EXAMPLES 1 TO 15

| Ex. No. | Composition of the composite yarn | | Type of composition | Thermal treatment conditions | Counts or deniers of the additional component yarn | Content ratio of the polypivalolactone component | Remarks |
|---|---|---|---|---|---|---|---|
| | Polypivalolactone component | Additional component | | | | | |
| 1 | B | Cotton | Single-covered yarn | 130° C. steam, 5 min | 80ˢ/1 and 80ˢ/2 | 12.8 | B as core. |
| 2 | D | do | Core-spun yarn | 123° C. steam, 15 min | 18ˢ/1 | 2.3 | Do. |
| 3 | E | Silk | Doubled-twisted yarn | 142° C. steam, 40 sec | 21 denur or average/3~2 | 2.3 | |
| 4 | C | do | Core-spun yarn | 175° C. dry, 27 min | 66ˢ/1 | 15.4 | C as core. |
| 5 | C | Polyethylene terephthalate (crimped) and spun silk | Double-covered yarn | 140° C. hot water, 33 sec | Ester 210 denier, silk 66ˢ/1 | 4.8 | Do. |
| 6 | E | Worsted | Doubled-twisted yarn | 120° C. steam 2 min | 48ˢ/2 | 0.8 | |
| 7 | D | Viscose rayon | Core-spun yarn | 130° C. steam, 2 min | 40ˢ/2 | 5.0 | D as core. |
| 8 | E | Nylon 6 | Doubled-twisted yarn | 180° C. dry heating, 45 sec. | 30 denier/25 filaments | 9.1 | |
| 9 | D | Nylon 6 (crimped) | Single-covered yarn | 190° C. dry heating, 50 sec. | 420 denier/68 filaments | 1.6 | Do. |
| 10 | E | Polyester | Doubled-twisted yarn | 137° C. hot water, 1.3 min. | 40 denier/10 filaments | 7.0 | |
| 11 | D | Polyester (crimped) | Single-covered yarn | 145° C. steam, 48 sec | 210 denier/34 filaments | 3.2 | Do. |
| 12 | A | Poly-γ-methyl glutamate | do | 190° C. dry heating, 1 min. | 120 denier/80 filaments | 21.1 | A as core. |
| 13 | E | Cotton | Double-covered yarn | 125° C. steam, 15 min | 30ˢ/1 | 21.6 | E and cotton blended as cores. |
| 14 | D | Polyvinyl alcohol filament | Single-covered yarn | 175° C. dry heating, 5 min. | 810 denier/270 filaments | | D as core. |
| 15 | C | Polyester-cotton blended | Doubled-twisted yarn | (¹) | 33ˢ/1/2 | 11.7 | |

¹ 120° C. (Hot water) ×2 min., 105° C. (Hot water)× 30 min., 165° C. (Dry heating) ×1 min.

In the following Table 4, parameters for load-elongation hysteresis of the highly elasticized composite yarns obtained in several examples are shown.

TABLE 4

| Example No. | Loading cycle | | | Unloading cycle | | | Percent elongation ¹ |
|---|---|---|---|---|---|---|---|
| | X in gr. | Y in gr. | Z | X in gr. | Y in gr. | Z | |
| 1 | 50.0 | 8.30 | 52.6 | 46.0 | 2.20 | 71.4 | 12.0 |
| 2 | 12.0 | 6.30 | 21.3 | | | | 15.0 |
| 3 | 21.3 | 22.30 | 38.5 | | | | 13.0 |
| 6 | 20.5 | 2.40 | 43.5 | 19.3 | 0.61 | 71.4 | 15.0 |
| 7 | 28.1 | 5.90 | 35.1 | 30.7 | 1.70 | 35.7 | 15.0 |
| 8 | 21.5 | 2.30 | 41.5 | 19.5 | 0.58 | 72.2 | 14.0 |
| 9 | 24.4 | 6.30 | 27.7 | 22.5 | 2.40 | 42.7 | 18.0 |
| 12 | 39.5 | 30.50 | 34.4 | 92.3 | 11.8 | 50.0 | 15.0 |
| 15 | 102.7 | 10.8 | 42.3 | 75.0 | 4.8 | 81.6 | 19.5 |

¹ Area for which parameters of Formula 9 are adaptable.

All of the load-elongation hysteresis curves of the yarns illustrated in Table 4 are, as apparently seen from FIGS. 7 to 13, provided with upwardly convex portions F on TABLE 5.—INITIAL MODULI AND ELONGATION RECOVERIES OF POLYPIVALOLACTONE FIBERS CONTAINED IN THE COMPOSITE YARNS

| Example No. | Initial modulus in gr./denier | Percent tensile recovery at— | | | |
|---|---|---|---|---|---|
| | | 5% elongation | 10% elongation | 15% elongation | 20% elongation |
| 1 | 35 | 97 | 95 | 93 | 91 |
| 2 | 40 | 95 | 94 | 92 | 90 |
| 3 | 45 | 98 | 95 | 94 | 93 |
| 4 | 37 | 96 | 95 | 93 | 90 |
| 5 | 50 | 97 | 95 | 93 | 92 |
| 6 | 47 | 98 | 93 | 93 | 92 |
| 7 | 41 | 95 | 94 | 93 | 91 |
| 8 | 48 | 98 | 98 | 97 | 93 |
| 9 | 46 | 98 | 95 | 93 | 92 |
| 10 | 62 | 98 | 94 | 91 | 91 |
| 11 | 42 | 97 | 95 | 94 | 91 |
| 12 | 26 | 99 | 96 | 95 | 95 |
| 13 | 44 | 98 | 97 | 95 | 94 |
| 14 | 43 | 97 | 94 | 93 | 92 |
| 15 | 39 | 98 | 98 | 97.5 | 97 |

EXAMPLE 1

The covering process adopted in the present example was carried out with a taking-up speed of 7 meters/min. and the resulting covered yarn was provided, when calculated from the rotating speed of the hollow spindle for covering, with twists of 960 twists/meter. The thermal treatment was accomplished by using a high pressured steamer at a temperature of 130° C. for 5 minutes and, after the heating, the temperature in the steamer was cooled down to 100° C. in 10 minutes. The high elastic composite yarn thus obtained was provided with good stretchability and excellent elongation recoverableness, and was woven or knitted into underwear or into light fabrics both in the form of a single yarn and a double yarn. The load-elongation hysteresis characteristics of the composite yarn obtained is graphically shown in FIG. 7, wherein both of the loading and unloading cycles are provided with upwardly convex portions F in the small elongation area.

EXAMPLE 2

The composite yarn shown in Table 3 was manufactured on a cotton spinning machine and twists of 18 twists/inch were bestowed. After spinning, the composite yarn was thermally treated in a high pressured steamer at a temperature of 123° C. for 5 minutes. Although the core component is not visible for the external observation on the resulting composite yarn, the yarn was provided with a moderate stretchability and tensile recoverableness, and sportswear made up of the high elastic composite yarn had a nice fit to various movements of the human body wearing it. In addition to such a dimensional flexibility, it possessed an instantaneous recovery from deformation, durable resistance against crease, comfortable humidity absorbability and a same degree of resistance against thermal attack with that possessed by the ordinary cotton fabrics.

For the purpose of comparison, two comparative examples were prepared, also. One of the examples was a core-spun yarn (comparative Example No. 1) containing a synthetic segment polyurethane yarn of 140 denier as a core component instead of the polypivalolactone yarn D, and another example was a core-spun yarn (comparative Example No. 2) containing a previously thermally elasticized polypivalolactone yarn of 140 denier as a core instead of the polypivalolactone yarn D. In the manufacturing of the two comparative examples, the composite yarns were supplied to the front roller with a previous draft of 2.4.

In FIG. 6, the curve $a$ is for the high elastic composite yarn of the present example according to the present invention, the curve $b$ is for the comparative Example No. 1 and the curve $c$ is for the comparative Example No. 2. As is apparently seen from the drawing, the curve $a$ is provided with an upwardly convex portion in the small elongation area while the curve $b$ has none of such upwardly convex portions. This means that the yarn of the present example is provided with an excellent stiffness represented by a large amount of load in the initial elongation area. This is further surprising if we consider the fact that the fineness of the polypivalolactone yarn used in the present example was of only just (7) seven denier and one-twentieth of the polyurethane segment elastomer yarn used in the comparative Example No. 1, and the fact that the content ratio of the polypivalolactone yarn in the resulting composite yarn of the present example was not more than 2.3%.

In the case of the composite yarn of the comparative Example No. 2, the content ratio of the polypivalolactone yarn was as large as 31.8% by weight and, as is apparent from an observation on the figurational characteristics of the curve $c$, the composite yarn possessed an extraordinarily large resistance against elongation. Because of such large elongation resistance, fabrics made up of the composite yarns present little elongation against loadings usually applied to clothing made of the fabric, and desirable handling quality of the sheath-component fibers tends to be degraded. Thus, the composite yarn of the comparative Example No. 2 does not conform to the objects of the present invention.

EXAMPLE 3

Figure 8:
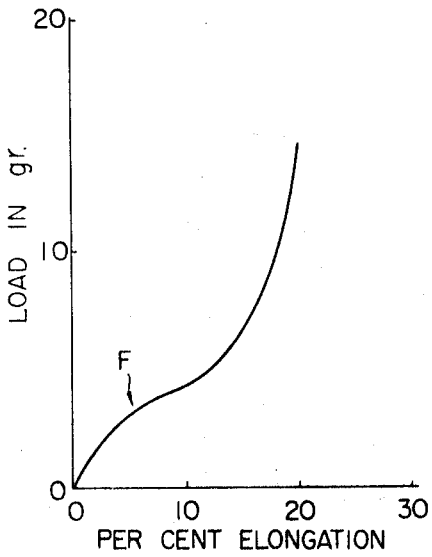
Figure 9:
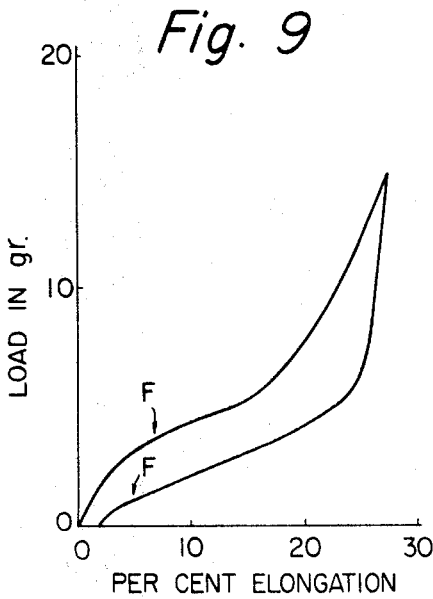
Figure 10:
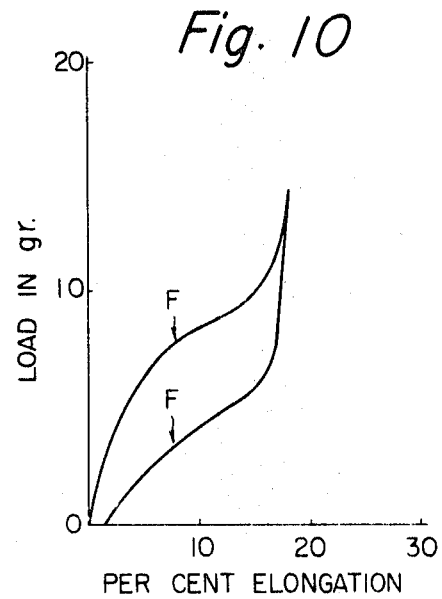

The composite yarn shown in Table 3 was manufactured on a conventional ring twister and a degummed silk yarn of 21 denier or an average ×3 was used as the sheath-forming component. Primary twists of 700 twists/meter and secondary twists of 600 twists/meter were imparted to the yarn. Next the silk yarn was untwisted by 160 twists/meter and the partially untwisted silk yarn was doubled with the polypivalolactone yarn E and thus combined yarns were twisted together by 150 twists/meter. Next, the twisted yarn was passed through a continuous steaming chamber at 142° C. for 40 seconds. After the thermal elasticization, the polypivalolactone yarn could not be externally observed as resulting in no degradation of the luminous effect by the silk component. Handling quality of the fabric made up of the composite yarns was not lowered by the presence of the polypivalolactone component and the crease resistant and stiffness of the fabric were rather improved. In FIG. 8, load-elongation behavior of the resulting composite yarn is graphically illustrated, wherein the curve has an upwardly convex portion F in its small elongation area.

EXAMPLE 4

The pre-elasticized composite yarn of the present example was prepared in a manner the same with that in Example 2 and the composite yarn obtained was next put into a non-contact type heating tube and dry heated at a temperature of 175° C. for 27 minutes. In the appearance of the resulting high elastic composite yarn, no presence of the polypivalolactone component was outwardly recognized and the appearance of the light weight fabric made up of the composite yarns was almost the same with that of the 100% cotton fabric even after an application of piece dyeing. Further, the functional properties of the fabric was similar to those possessed by the fabrics illustrated in Example 3.

EXAMPLE 5

In the manufacture of the pre-elasticized composite yarn of the present example, the polyester filament yarn was twisted into an S-direction by 960 twists/meter and the silk yarn was twisted by 800 turns/meter. A double covering operation proceeded at a yarn speed of 8 meters/min. Next, the covered yarn was advanced through a pressurized hot water chamber and was heated at a temperature of 140° C. for 33 seconds. The resulting high elastic composite yarns were desirably used for lady's clothing

EXAMPLE 6

The pre-elasticized composite yarn was prepared on a conventional ring twister by firstly doubling two worsted yarns of 48s/1 with the polypivalolactone yarn E while previously imparting Z-twists of 500 twists/meter to the worsted yarns. Next, the doubled yarn was provided with S-twists of 500 twists/meter. The rotation speed of the spindle of the ring twister was 7,000 r.p.m. Next, the composite yarn was placed in a pressurized steam and heated at a temperature of 120° C. for 2 min. A mat-weave fabric for slacks was made of thus elasticized composite yarns. The slacks obtained was provided with complete instantaneous recovery from deformation and no fatigue in the deformation recoverableness was observed. The load-elongation hysteresis characteristics of the high elastic composite yarn of the present example is graphically shown in FIG. 9, wherein both of the loading and unloading cycles are provided with upwardly convex portions F in the small elongation area.

The functional properties of the thus obtained high elastic composite yarn were so high that the highly functional properties could hardly be expected in the conventional worsted doubled yarns containing the conventional synthetic textured yarn, rubber yarn or synthetic segment polyurethane yarn. Because of the relatively high degreed thermal stability of the composite yarn obtained, the fabrics made up of the composite yarns can well withstand repeated thermal attacks which usually take place in the subsequent thermal treatments applied to the worsted fabric. No particular attention is required for protecting the fabric from such thermal attacks. It is further surprising that such highly degreed functional properties of the composite yarn can be obtained with such a small content ratio of the polypivalolactone component as 0.8% in the composition of the composite yarn and that, because the composite yarns were used only for fillings, the actual content ratio of the polypivalolactone component was only about 0.4% in the composition of the resulting fabric.

EXAMPLE 7

The pre-elasticized composite yarn of the present example was made in a manner the same with that in Example 2 and was heated within a pressured steamer at 130° C. for 2 min. The resulting high elastic composite yarns were used for working-wear which was provided with durable resistance against crease and confortable fit for wearing. The load-elongation hysteresis characteristics is graphically shown in FIG. 10, wherein both of the loading and unloading cycles are provided with upwardly convex portions F in its small elongation area.

EXAMPLES 8 AND 9

Figure 11:
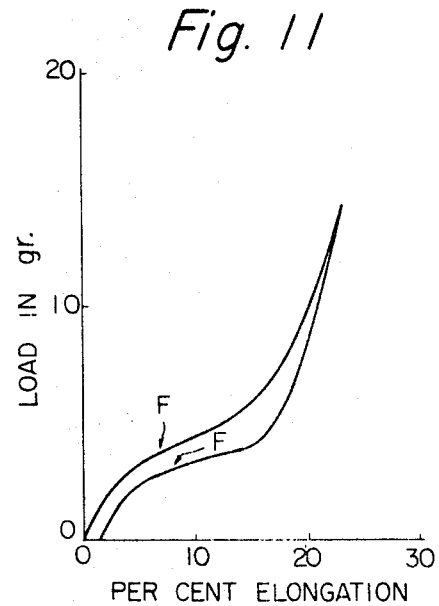
Figure 12:
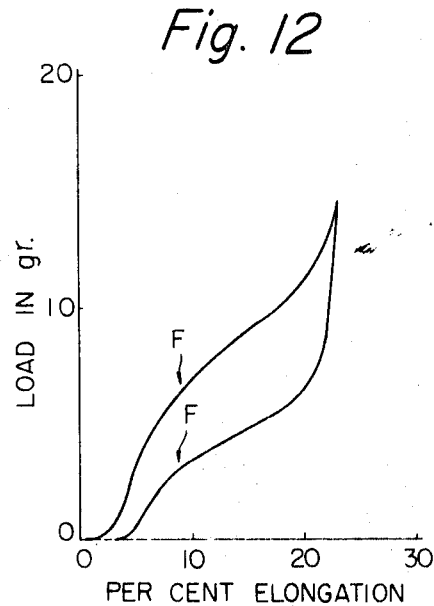
Figure 13:
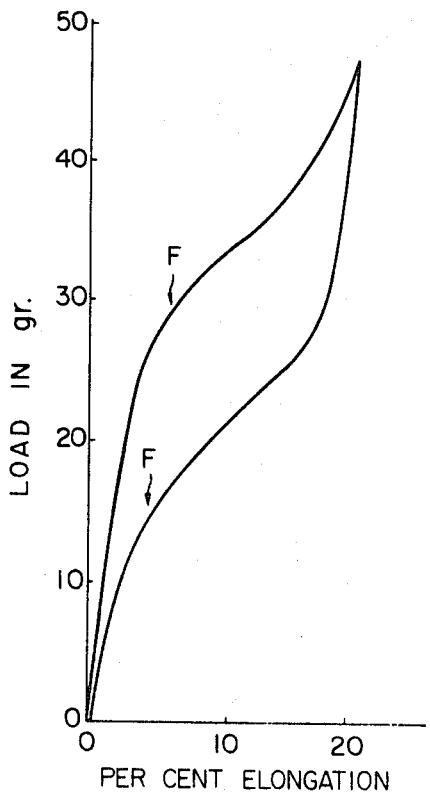

The elasticized composite yarn of Example 8 was manufactured in a method the same with that of Example 3 and its load-elongation hysteresis curve is shown in FIG. 11, wherein both of the loading and unloading cycles are provided with upwardly convex portions F in its elongation area below 10%. Manufacturing of the pre-elasticized composite yarn of Example 9 was performed by firstly covering the core polypivalolactone yarn D in a Z direction with a previously covered sheath nylon 6 yarn having Z-twists of 210 turns/meter. The total number of twist of the resulting covered yarn was of 785 turns/meter and the taking-up speed of the yarn was of 6 meters/min. Next, the covered yarn was passed through a heating tube of a noncontact type and the covered yarn of Example 8 was heated at 180° C. for 45 seconds while the covered yarn of Example 9 was heated at 190° C. for 50 seconds in dry conditions. The load-elongation hysteresis behavior of the elasticized composite yarn of Example 9 is graphically shown in FIG. 12, wherein both of the loading and unloading cycles are provided with upwardly convex portions F in the vicinity of 10% elongation.

In case of the conventional nylon doubled and twisted yarns, particularly conventional composite yarns containing nylon 6 crimped textured yarns, its configurational stability was apt to be lowered by repeated elongation or laundering applications. In contrast to this, the yarns of the present examples have eliminated all the above-described drawbacks.

EXAMPLES 10 AND 11

The pre-elasticized composite yarn of Example 10 was prepared in a manner the same with that in Example 3 and the pre-elasticized composite yarn resulted was heated within an autoclave at 137° C. for 1.3 min. with hot water.

The pre-elasticized composite yarn of Example 11 was prepared in a manner the same with that in Example 9 and heated at 145° C. for 48 seconds while advancing through a continuous steam chamber.

Both of the resulting high elastic composite yarns were woven or knitted into fabrics without any processing troubles.

EXAMPLE 12

The pre-elasticized composite yarn of the present example was obtained in a manner the same with that in Example 1. Next, the composite yarn was heated at 190° C. for 1 min. on a hot air dryer circulation type. The load-elongation hysteresis behavior of the resulting high elastic yarn is graphically shown in FIG. 13, wherein both of the loading and unloading cycles are provided with upwardly convex portions F in the elongation area below 10%. Although the conventional fabrics made up of only poly-γ-methyl glutamate fibers have poor resistance against creasing and their creases formed by washing thereof were difficult to remove later on, the fabrics for lady's clothing made up of the high elastic composite yarns of the present example have complete elimination of the above-described drawbacks without degrading the luminous effects thereof.

EXAMPLE 13

In the manufacturing of the pre-elasticized composite yarn of the present example, polypivalolactone staple fibers E of 37 mm. cut length are blended with cotton fibers in weight ratio of 80/20. From these blended material fibers, a blended yarn of 40s/1 having turns of 25 turns/inch was manufactured on a cotton spinning machine in a manner the same as that in Example 2. This core-forming blended yarn was next covered with a cotton yarn of 30s/1 in a manner of Example 1 and the covered yarn was heated at 125° C. for 15 min. in a pressurized steam chamber. Because of its moderately small stretchability, a rope made up of the obtained elasticized composite yarn has an excellent absorbability to shocks or impact loadings applied to the rope and was more suitable for fastening articles than the conventional cotton ropes.

EXAMPLE 14

The pre-elasticized composite yarn of the present example was prepared by using a polyvinyl alcohol treated with an aldehyde multifilament yarn of 810 denier/270 filaments as a core-component and winding the core-component with 30 doubled polypivalolactone yarn D. This covering was performed at a taking-up speed of 10 meters/min. and the number of twists imparted to the yarn, when calculated from the rotation speed of the covering spindle, was 620 twists/meter. Next, the covered yarn was heat treated on a circulation type hot air dryer of a circulation type at 175° C. for 5 min. The industrial hose made up of the obtained elasticized composite yarns had an excellent absorbability against impact loading application.

EXAMPLE 15

In the manufacturing of the pre-elasticized composite yarn of the present example, a polyester-cotton blended yarn of 32s/1 was made from 65% by weight of polyester fibers and 35% by weight of cotton fibers. Two of the thus prepared polyester-cotton blended yarns were doubled with four polypivalolactone yarns C, and the doubled yarn was twisted by 27.6 twists/inch on a conventional type ring twister. Next, a fabric of satin weave having a reed space of 57 inches and total warp number of 9300 was woven using thus prepared composite yarn of 15s/1. After desizing, scouring and bleaching, the satin fabric was pre-treated within a hot water bath of 120° C. for about 2 min. and dyed at 105° C. in beam-dyeing equipment. After washing with water, the dyed satin fabric was dried on a loop-type dryer by exposing it to hot air of 165° C. The resulting fabric, having a width of 41.5 inches, was completely elasticized by this thermal treatment. Casual slacks made of this fabric had a nice fit to human body movements, quick and almost complete recovery from the deformations, durable resistance against creasing and good maintenance of its load-deformation characteristics even after repeated laundering applications. By extracting the filling from this fabric and testing it at a total test length of 90 m. under 7.5 gr. yarn tension, the total count of the elasticized composite yarn of the present example was estimated to be 10.2s. The content ratio of the polypivalolactone component within the elasticized composite yarn was 11.7% by weight.

As is apparent from the above illustration, elasticization of the polypivalolactone component of the fibrous composite of the present invention can be carried out by applying a thermal treatment upon the fibrous composite in the form of fabrics, also.

Next, the polypivalolactone fiber was extracted from the above-described filling yarn and its elongation recoverableness was measured. The obtained result is graphically shown in FIG. 14 together with that of the pre-elasticized polypivalolactone fiber. In the drawing, the curve $a$ is for elasticized polypivalolactone fiber, curve $b$ for preelasticized polypivalolactone fiber, curve $c$ for nylon 6 and nylon 66, curve $d$ for wool, curve $e$ for polyesters, curve $f$ for acrylics, curve $g$ for silk and curve $h$ for viscose rayon.

As is apparently shown in FIG. 14, the elasticized polypivalolactone fiber of the present invention is provided with excellent elongation recoverableness that could hardly be possessed by any of the conventional fibers, high degreed resistance against elongation and large elongation recovery power. It is also proved that the elastic composite yarn of the present invention satisfies the relation defined by the above-described Equation 9 and gives the parameters the values as defined in Table 1.

What is claimed is:

1. A method for manufacturing a high elastic fibrous composite containing polypivalolactone high elastic yarn comprising, forming a single composite yarn by uniting, in a non-stretched state, at most 25% by weight of a non-elasticized yarn substantially composed of polypivalolactone fibers capable of enhancing elongation recoverableness thereof by exposure to heat together with at least 75% by weight of other componental yarns substantially composed of non-elastic fibers not capable of enhancing elongation recoverableness thereof by said exposure to heat and thereafter subjecting said single composite yarn to an elasticizing thermal treatment carried out at a temperature of 100° C. or higher but not exceeding a temperature 20° C. below the lowest temperature of melting points and decomposition points of said component fibers; thereby greatly enhancing said elongation recoverableness of said polypivalolactone fibers.

2. A method as claimed in claim 1, wherein the content ratio of said polypivalolactone fibers within said single composite yarn is smaller than 10% by weight.

3. A method as claimed in claim 2, wherein said content ratio is at most 5% by weight.

4. A method as claimed in claim 2, wherein said content ratio is at most 1% by weight.

5. A method as claimed in claim 1, wherein said polypivalolactone yarn is supplied in the form of a filament yarn having a fineness of at most 70 denier.

6. A method as claimed in claim 5, wherein said fineness is at most 30 denier.

7. A method as claimed in claim 5, wherein said fineness is at most 20 denier.

8. A method as claimed in claim 1, wherein said polypivalolactone yarn is supplied in the form of a spun yarn.

9. A method as claimed in claim 1, wherein said single composite yarn is a core-sheath type yarn in which said polypivalolactone yarn is incorporated as a core-component and said other componental yarns are incorporated as sheath-components encircling said core-component.

10. A method as claimed in claim 1, wherein said other componental yarn covers said polypivalolactone yarn in a coil-like configuration.

11. A method as claimed in claim 1, wherein said other componental yarns are supplied in the form of spun yarns and said uniting of said polypivalolactone yarn with said other componental yarns is carried out by incorporating said polypivalolactone yarn as a core-forming component to said other componental yarns in a spinning operation of said other componental yarns.

12. A method as claimed in claim 1, wherein said uniting of said polypivalolactone yarn with said other componental yarn is carried out by doubling and twisting together said polypivalolactone yarn with said other componental yarns.

13. A method as claimed in claim 1, wherein said thermal treatment is carried out after said single composite yarns are constructed into a fabric.

14. A method as claimed in claim 1, wherein said thermal treatment is carried out while said single composite yarn is in a relaxed state.

15. A method as claimed in claim 1, wherein said thermal treatment is carried out while fixing said single composite yarn in a definite length.

16. A method as claimed in claim 1, wherein said thermal treatment is carried out while maintaining a yarn temperature of at least 120° C.

17. A method as claimed in claim 16, wherein said yarn temperature is at least 150° C.

18. A method as claimed in claim 1, wherein said thermal treatment is carried out under such processing conditions as are capable of providing said polypivalolactone fibers with an initial modulus of at least 15 gr./denier; and a percent tensile recovery of at least 95 from 5% elongation, at least 92 from 10% elongation, at least 88 from 15% elongation and at least 85 from 20% elongation.

19. A high elastic fibrous composite having a high degree of elongation recoverability and manufactured by the method as claimed in claim 1; comprising at most 25% by weight of high elastic yarn substantially composed of polypivalolactone fibers and at least 75% by weight of other componental yarns substantially composed of non-elastic fibers; said high elastic yarn having an initial modulus of at least 15 gr./denier and a percent tensile recovery of at least 95 from 5% elongation, at least 92 from 10% elongation, at least 88 from 15% elongation and at least 85 from 20% elongation.

20. A high elastic fibrous composite as claimed in claim 19, wherein the content ratio of said high elastic yarn is smaller than 10% by weight.

21. A high elastic fibrous composite as claimed in claim 19, wherein said content ratio is 5% or smaller by weight.

22. A high elastic fibrous composite as claimed in claim 19, wherein said content ratio is 1% or smaller by weight.

23. A high elastic fibrous composite as claimed in claim 19, wherein said polypivalolactone yarn is a filament yarn having a fineness of 70 denier or smaller.

24. A high elastic fibrous composite as claimed in claim 23, wherein said fineness is 30 denier or smaller.

25. A high elastic fibrous composite as claimed in claim 23, wherein said fineness is 20 denier or smaller.

26. A high elastic fibrous composite as claimed in claim 19, wherein said polypivalolactone yarn is a spun yarn.

27. A high elastic fibrous composite as claimed in claim 19, wherein said high elastic polypivalolactone yarn is covered with said other componental yarns in a core-sheath-like configuration.

28. A high elastic fibrous composite as claimed in claim 27, wherein said sheath-forming other componental yarns are provided with numerous outwardly protruding loops in a bulky condition.

29. A high elastic fibrous composite as claimed in claim 27, wherein said sheath-forming other componental yarns are wound around said core-forming highly elasticized yarn in a coil-like configuration.

30. A high elastic fibrous composite as claimed in claim 19, wherein both loading and unloading cycles of a load-elongation hysteresis curved of said fibrous composite is an elongation area of at most 90% of its rupture elongation are provided with, an elongation area of at most 20%, portions wherein differential coefficient decreases with increase in load.

References Cited

UNITED STATES PATENTS

| | | | |
|---|---|---|---|
| 3,299,171 | 1/1967 | Knobloch et al. | 57—144X |
| 3,379,001 | 4/1968 | Campbell et al. | 57—140 |
| 3,416,302 | 12/1968 | Knospe | 57—140 |
| 3,438,193 | 4/1969 | Kosaka et al. | 57—144 |
| 3,446,005 | 5/1969 | Kosaka et al. | 57—157 |

JOHN PETRAKES, Primary Examiner

U.S. Cl. X.R.

28—72.17; 57—144, 157R, 163